United States Patent
Kuang et al.

(10) Patent No.: US 9,282,606 B1
(45) Date of Patent: Mar. 8, 2016

(54) DIMMER COMPATIBLE LED DRIVING APPARATUS WITH BLEEDING CIRCUIT

(71) Applicant: Chengdu Monolithic Power Systems Co., Ltd., Chengdu (CN)

(72) Inventors: Naixing Kuang, Hangzhou (CN); Jiali Cai, Hangzhou (CN); Lin Feng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/738,680

(22) Filed: Jun. 12, 2015

(30) Foreign Application Priority Data

Dec. 16, 2014 (CN) .............................. 201410782320

(51) Int. Cl.
H05B 37/02 (2006.01)
H05B 33/08 (2006.01)

(52) U.S. Cl.
CPC ........ *H05B 33/0815* (2013.01); *H05B 33/0845* (2013.01)

(58) Field of Classification Search
USPC ............................... 315/200 R–224, 291–307
See application file for complete search history.

(56) References Cited

U.S. PATENT DOCUMENTS

| | | |
|---|---|---|
| 2011/0285301 A1 | 11/2011 | Kuang et al. |
| 2012/0319621 A1* | 12/2012 | Sutardja ............. H05B 33/0815 315/307 |
| 2013/0154487 A1 | 6/2013 | Kuang et al. |

* cited by examiner

*Primary Examiner* — Douglas W Owens
*Assistant Examiner* — Jonathan Cooper
(74) *Attorney, Agent, or Firm* — Perkins Coie LLP

(57) ABSTRACT

An LED driving apparatus includes a rectifier bridge generating a DC bus voltage, a bus capacitor coupled between the output terminal of the rectifier bridge and a reference ground, a tank element, a first transistor, a second transistor, a freewheeling switch, an output capacitor, a voltage sensing circuit generating a voltage sensing signal indicative of the DC bus voltage, a bleeding circuit providing a bleeding current for the bus capacitor, and a bleeding control circuit generating a control signal to control the bleeding circuit based on the voltage sensing signal.

20 Claims, 7 Drawing Sheets

US 9,282,606 B1

DIMMER COMPATIBLE LED DRIVING APPARATUS WITH BLEEDING CIRCUIT

CROSS-REFERENCE TO RELATED APPLICATIONS

This application claims the benefit of CN applications 201410262033.3 and 201410261980.0, both filed on Jun. 13, 2014 and incorporated herein by reference.

TECHNICAL FIELD

The present invention generally relates to electronic circuits, and more particularly but not exclusively to LED driving apparatuses which are compatible with dimmers.

BACKGROUND

Nowadays, there is an increasing interest to replace conventional incandescent bulbs with LEDs (light emitting diodes). Nevertheless, how to make LED driving apparatus be compatible with dimmers in existing lighting apparatuses becomes a challenge.

The most common dimmers are phase cut dimmers including leading edge dimmers and trailing edge dimmers, wherein the main supply is cut off for part of the main cycle. In some situations, the dimmer has been removed so there is no dimmer. To sum up, there are three different dimming conditions: leading edge dimming, trailing edge dimming and no dimming.

A bleeding circuit is often employed to improve dimming performance of the LED driving apparatus. A prior art bleeding circuit including a bleeding resistor Rp and a bleeding transistor Sp is shown in FIG. 1. The bleeding transistor Sp turns on to provide a bleeding current when the bus voltage Vbus is smaller than a predetermined value.

Since the bleeding circuit shown in FIG. 1 is coupled between the output terminal of the rectifier bridge and the reference ground, the bleeding transistor Sp therein need to sustain a high voltage, which makes it expensive and hard to be integrated.

Moreover, due to the significantly different working principles, the bleeding current required in trailing edge dimming is much larger than that needed in leading edge dimming. As a result, the bleeding resistor Rp is generally designed to be relatively small to fit both leading edge dimming and trailing edge dimming, which absolutely limits the efficiency of the LED driving apparatus in leading edge dimming. In no dimming situations, the efficiency suffers even more.

SUMMARY

Embodiments of the present invention are directed to an LED driving apparatus comprising: a rectifier bridge having an output terminal, wherein the rectifier bridge is configured to generate a DC bus voltage at the output terminal; a bus capacitor coupled between the output terminal of the rectifier bridge and a reference ground; a tank element having a first terminal and a second terminal, wherein the first terminal is coupled to the output terminal of the rectifier bridge; a first transistor having a first terminal, a second terminal and a control terminal, wherein the first terminal is coupled to the second terminal of the tank element; a second transistor having a first terminal, a second terminal and a control terminal, wherein the first terminal is coupled to the second terminal of the first transistor, the second terminal is coupled to the reference ground; a bleeding circuit coupled between the second terminal of the first transistor and the reference ground, wherein the bleeding circuit is configured to provide a bleeding current for the bus capacitor; a voltage sensing circuit coupled to the output terminal of the rectifier bridge, wherein the voltage sensing circuit generates a voltage sensing signal indicative of the DC bus voltage; a bleeding control circuit coupled to the voltage sensing circuit, wherein based on the voltage sensing signal, the bleeding control circuit generates a control signal to control the bleeding circuit; a free-wheeling switch coupled between the tank element and LEDs; and an output capacitor coupled to the LEDs in parallel.

Embodiments of the present invention are also directed to an integrated circuit used in an LED driving apparatus, wherein the LED driving apparatus includes a rectifier bridge providing a DC bus voltage at an output terminal, a bus capacitor coupled between the output terminal of the rectifier bridge and a reference ground, a tank element coupled to the output terminal of the rectifier bridge, and a first MOSFET with its drain terminal coupled to the tank element, and wherein the IC comprises: a second MOSFET having a drain terminal, a source terminal and a gate terminal, wherein the drain terminal is coupled to the source terminal of the first MOSFET, the source terminal is coupled to the reference ground; a bleeding circuit coupled between the source terminal of the first MOSFET and the reference ground, wherein the bleeding circuit is configured to provide a bleeding current for the bus capacitor; and a bleeding control circuit configured to generate a control signal to control the bleeding circuit based on a voltage sensing signal indicative of the DC bus voltage.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
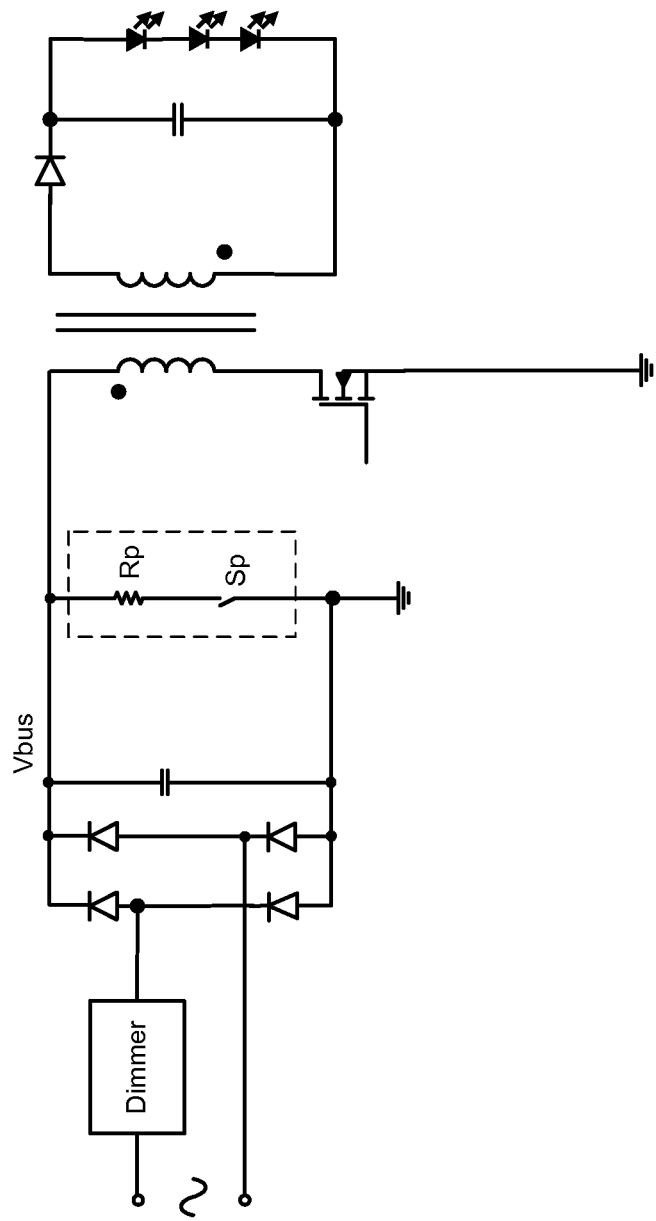
FIG. 1 schematically illustrates a prior art LED driving apparatus with a bleeding circuit.
Figure 2:
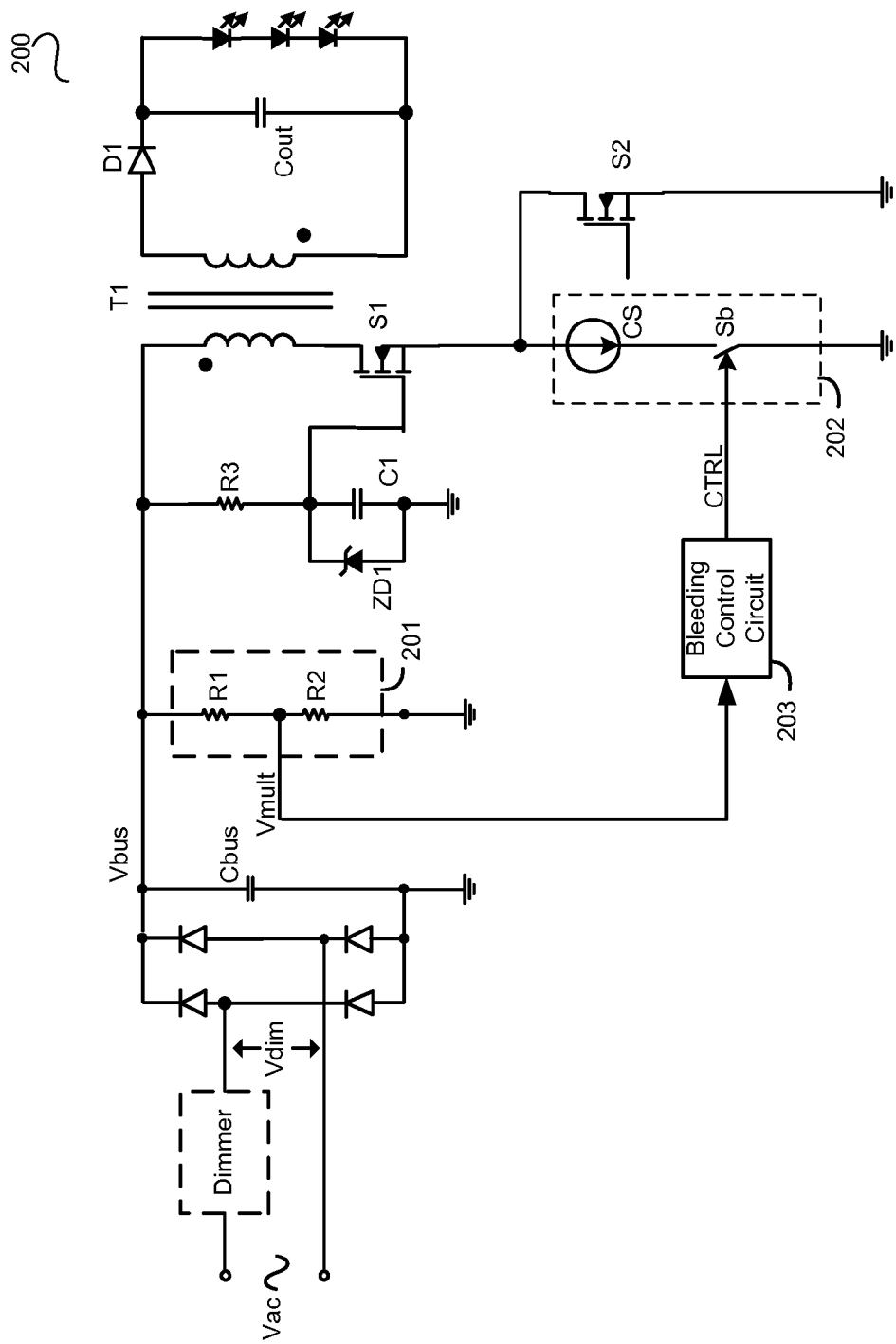
FIG. 2 schematically illustrates a block diagram of an LED driving apparatus 200 in accordance with an embodiment of the present invention.

FIG. 2 schematically illustrates a block diagram of an LED driving apparatus 200 in accordance with an embodiment of the present invention. The LED driving apparatus 200 comprises a rectifier bridge, a bus capacitor Cbus, a voltage sensing circuit 201, a bleeding circuit 202, a bleeding control circuit 203 and a flyback circuit including a transformer T1, transistors S1, S2, a diode D1 and an output capacitor Cout. The rectifier bridge is configured to rectify a voltage Vdim and generate a DC bus voltage Vbus at its output terminal. The bus capacitor Vbus is coupled between the output terminal of the rectifier bridge and a reference ground. In some embodiments, the voltage Vdim is output by a phase cut dimmer wherein an AC input voltage Vac is cut off for part of the main cycle. In some other embodiments, the phase cut dimmer is removed and the voltage Vdim is equal to the AC input voltage Vac.

The transformer T1 has a primary winding and a secondary winding, wherein the primary winding and secondary winding both have a first terminal and a second terminal. The first terminal of the primary winding is coupled to the output terminal of the rectifier bridge to receive the DC bus voltage Vbus. The first transistor S1 has a first terminal, a second terminal and a control terminal, wherein the first terminal is coupled to the second terminal of the primary winding. The second transistor S2 has a first terminal, a second terminal and a control terminal, wherein the first terminal is coupled to the second terminal of the first transistor S1, the second terminal is coupled to the reference ground. The transistors S1 and S2 may be any controllable semiconductor transistor, such as MOSFET.

The diode D1 has an anode and a cathode, wherein the anode is coupled to a first terminal of the secondary winding, the cathode is coupled to LEDs. The output capacitor Cout is coupled between the cathode of the diode D1 and the second terminal of the secondary winding. Although the diode D1 is used for free-wheeling in the embodiment of FIG. 5, people of ordinary skill in the art can recognize that the diode D1 may also be replaced by other suitable free-wheeling switches, such as MOSFET. There are only three LEDs shown in FIG. 2, but it can be easily understood that the LED driving apparatus 200 may be used to drive an LED string constituted of one or more LEDs, or a plurality of LED strings connected in parallel.

The bleeding circuit 202 is coupled between the second terminal of the first transistor S1 and the reference ground. It is configured to provide a bleeding current for the bus capacitor Cbus, so as to make sure a leading edge dimmer or a trailing edge dimmer can work normally when coupled to the LED driving apparatus. The voltage sensing circuit 201 is coupled to the output terminal of the rectifier bridge. It senses the DC bus voltage Vbus and generates a voltage sensing signal Vmult indicative of the DC bus voltage. In the embodiment shown in FIG. 2, the voltage sensing circuit 201 consists of a resistor divider including resistors R1 and R2.

The bleeding control circuit 203 is coupled to the voltage sensing circuit 201 and is configured to generate a control signal CTRL to control the bleeding circuit 202 based on the voltage sensing signal Vmult.

In the embodiment of FIG. 2, the bleeding circuit 202 includes a bleeding current source CS and a bleeding transistor Sb. The bleeding current source CS has a first terminal and a second terminal, wherein the first terminal is coupled to the second terminal of the first transistor S1 and the first terminal of the second transistor S2. The bleeding transistor Sb has a first terminal, a second terminal and an output terminal, wherein the first terminal is coupled to the second terminal of the bleeding current source CS, the second terminal is coupled to the reference ground, and the control terminal is coupled to the bleeding control circuit 203 to receive the control signal CTRL. Since the bleeding circuit 202 is coupled between the first transistor S1 and the reference ground, the bleeding transistor Sb does need to sustain a high voltage and thus is easy to be integrated with the bleeding current source CS, the second transistor S2 and the bleeding control circuit 203.

In some embodiments, the switching converter 200 further comprises a resistor R3, a capacitor C1 and a zener diode ZD1, connected as shown in the figure.

Figure 3:
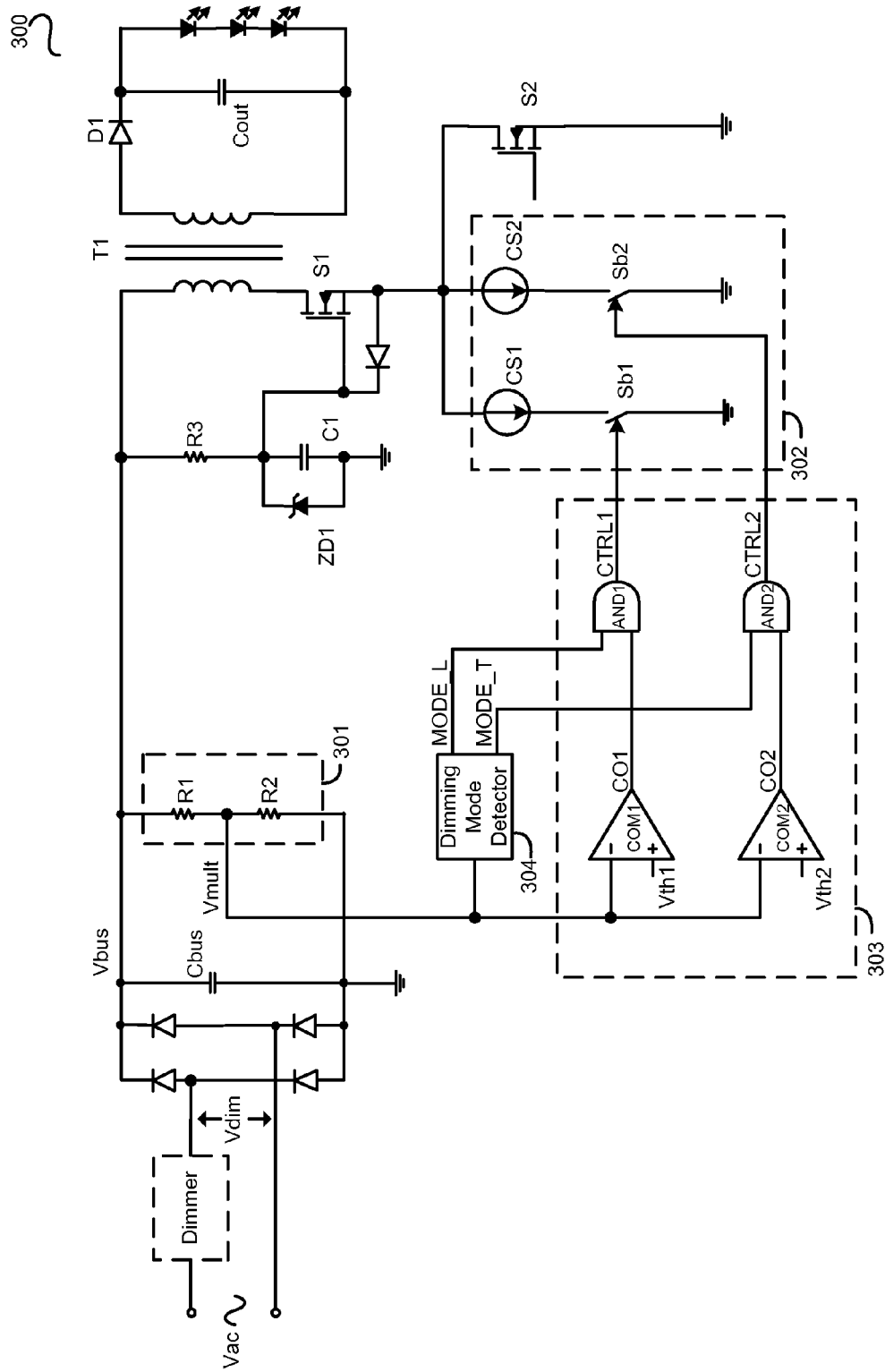
FIG. 3 schematically illustrates a block diagram of an LED driving apparatus 300 in accordance with an embodiment of the present invention.

FIG. 3 schematically illustrates a block diagram of an LED driving apparatus 300 in accordance with an embodiment of the present invention. Compared with that shown in FIG. 2, the LED driving apparatus 300 further comprises a dimming mode detector 304 which is coupled to the voltage sensing circuit 301 and the bleeding control circuit 303. Based on the voltage sensing signal Vmult, the dimming mode detector 304 detects whether the LED driving apparatus is coupled to a leading edge dimmer or a trailing edge dimmer, and provides a leading edge dimming mode signal MODE_L and a trailing edge dimming mode signal MODE_T to the bleeding control circuit 303. The dimming mode detector 304 may detect the type of the dimmer based on the slew rate or virtual value of the voltage sensing signal Vmult.

Based on the voltage sensing signal Vmult, the leading edge dimming mode signal MODE_L and the trailing edge dimming mode signal MODE_T, the bleeding control circuit 303 generates a first control signal CTRL1 and a second control signal CTRL2 to control the bleeding circuit 302. In one embodiment, the bleeding control circuit 303 comprises comparators COM1, COM2 and AND gates AND1, AND2. The first comparator COM1 has a first input terminal, a second input terminal and an output terminal, wherein the first input terminal is coupled to the voltage sensing circuit 301, the second input terminal is configured to receive a first threshold voltage Vth1. The first comparator COM1 compares the voltage sensing signal Vmult with the first threshold voltage Vth1 and generates a first comparison signal CO1 at the output terminal. The second comparator COM2 has a first input terminal, a second input terminal and an output terminal, wherein the first input terminal is coupled to the voltage sensing circuit 301, the second input terminal is configured to receive a second threshold voltage Vth2, and wherein the second comparator COM2 compares the voltage sensing signal Vmult with the second threshold voltage Vth2 and generates a second comparison signal CO2 at the output terminal. The first AND gate AND1 has a first input terminal, a second input terminal and an output terminal, wherein the first input terminal is coupled to the dimming mode detector 304 to receive the leading edge dimming mode signal MODE_L, the second input terminal is coupled to the output terminal of the first comparator COM1 to receive the first comparison signal CO1, the output terminal is configured to provide the first control signal CTRL1. The second AND gate AND2 has a first input terminal, a second input terminal and an output terminal, wherein the first input terminal is coupled to the dimming mode detector 304 to receive the trailing edge dimming mode signal MODE_T, the second input terminal is coupled to the output terminal of the second comparator COM2 to receive the second comparison signal CO2, the output terminal is configured to provide the second control signal CTRL2.

The bleeding circuit 302 comprises bleeding current source CS1, CS2 and bleeding transistors Sb1, Sb2. The first bleeding current source CS1 has a first terminal and a second terminal, wherein the first terminal is coupled to the second terminal of the first transistor S1 and the first terminal of the second transistor S2. The first bleeding transistor Sb1 has a first terminal, a second terminal and an output terminal, wherein the first terminal is coupled to the second terminal of the first bleeding current source CS1, the second terminal is coupled to the reference ground, and the control terminal is coupled to the bleeding control circuit 303 to receive the first control signal CTRL1. The second bleeding current source CS2 has a first terminal and a second terminal, wherein the first terminal is coupled to the second terminal of the first transistor S1 and the first terminal of the second transistor S2. The second bleeding transistor Sb2 has a first terminal, a second terminal and an output terminal, wherein the first terminal is coupled to the second terminal of the second bleeding current source CS2, the second terminal is coupled to the reference ground, and the control terminal is coupled to the bleeding control circuit 303 to receive a second control signal CTRL2.

The bleeding transistors Sb1, Sb2 and the second transistor S2 are coupled between the first transistor S1 and the reference ground, thus do not need to sustain high voltage. This allows IC manufacturers to fabricate the bleeding circuit 302, bleeding control circuit 303, dimming mode detector 304 and the second transistor S2 on a single IC.

When the LED driving apparatus 300 is coupled to a leading edge dimmer, the leading edge dimming mode signal MODE_L is logical high and the trailing edge dimming ode signal is logical low. The first bleeding transistor Sb1 turns on when the voltage sensing signal Vmult becomes smaller than the first threshold voltage Vth1, and the first bleeding current source CS1 provides a first bleeding current Ib1 for the bus capacitor Cbus. When the LED driving apparatus 300 is coupled to a trailing edge dimmer, the leading edge dimming mode signal MODE_L is logical low and the trailing edge dimming ode signal is logical high. The second bleeding transistor Sb2 turns on when the voltage sensing signal Vmult becomes smaller than the second threshold voltage Vth2, and the second bleeding current source CS2 provides a second bleeding current Ib2 which is typically larger than the first bleeding current Ib1. When the LED driving apparatus 300 is neither coupled to a leading edge dimmer nor a trailing edge dimmer, the leading edge dimming mode signal MODE_L and the trailing edge dimming mode signal are both logical low. The bleeding transistors Sb1 and Sb2 both turn off and the bleeding circuit 302 stops providing any bleeding current.

Figure 4:
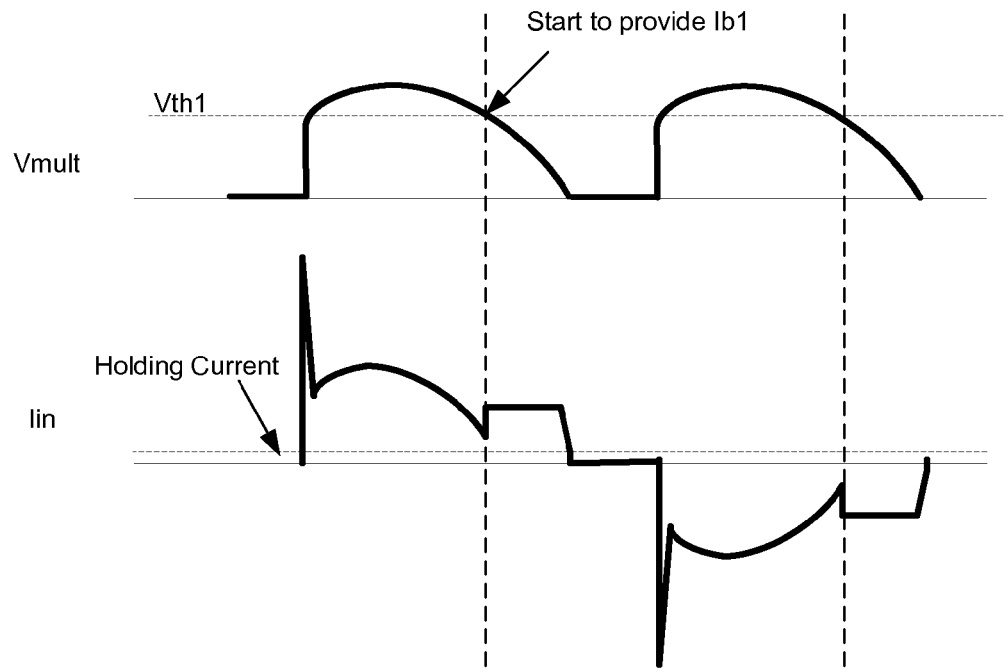
FIG. 4 schematically illustrates working waveforms of the LED driving apparatus 300 when it is coupled to a leading edge dimmer.

As can be seen from FIG. 4, when the LED driving apparatus 300 is coupled to a leading edge dimmer, the bleeding circuit 302 provides the first bleeding current Ib1 when the voltage sensing signal Vmult becomes smaller than the first threshold voltage Vth1. Therefore, the input current Iin of the LED driving apparatus 300 is larger than the holding current of the leading edge dimmer, which induces the dimmer to keep on until the AC input voltage Vac crosses zero. By doing so, the potential dimmer muti-fire is eliminated.

Figure 5:
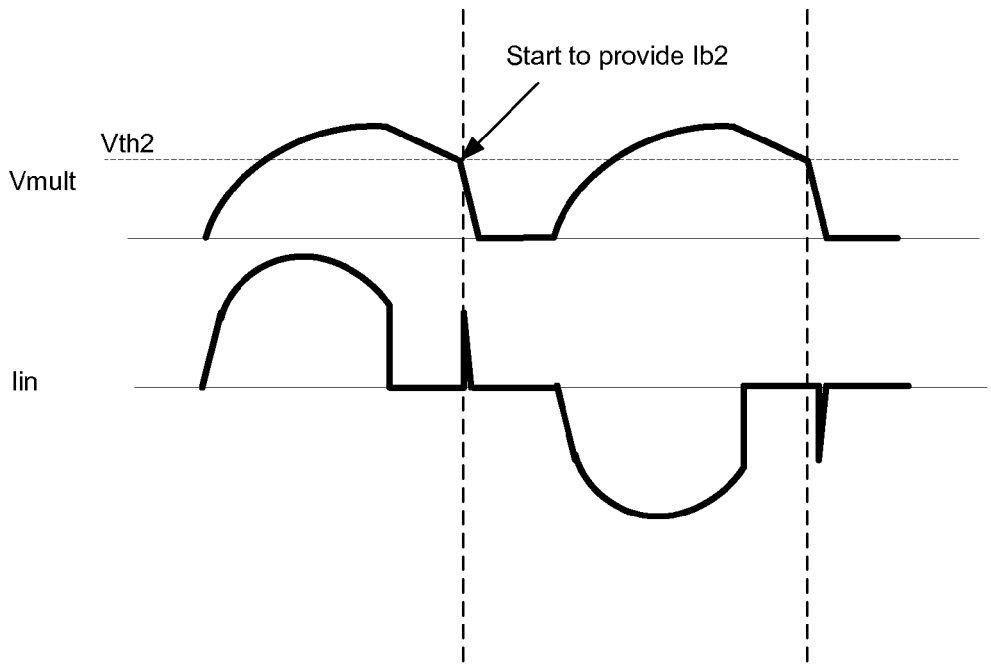
FIG. 5 schematically illustrates working waveforms of the LED driving apparatus 300 when it is coupled to a trailing edge dimmer.

As further can be seen from FIG. 5, when the LED driving apparatus 300 is coupled to a trailing edge dimmer, the bleeding circuit 302 provides the second bleeding current Ib2 to discharge the bus capacitor Cbus when the voltage sensing signal Vmult becomes smaller than the second threshold voltage Vth2. The DC bus voltage Vbus rapidly reduces to zero and the potential flicker has been avoided.

The bleeding currents Ib1 and Ib2 can be either constant or variable. Through detecting whether the LED driving apparatus is coupled to a leading edge dimmer or a trailing edge dimming and providing different bleeding current in different dimming conditions, the working efficiency of the LED driving apparatus is optimized.

Figure 6:
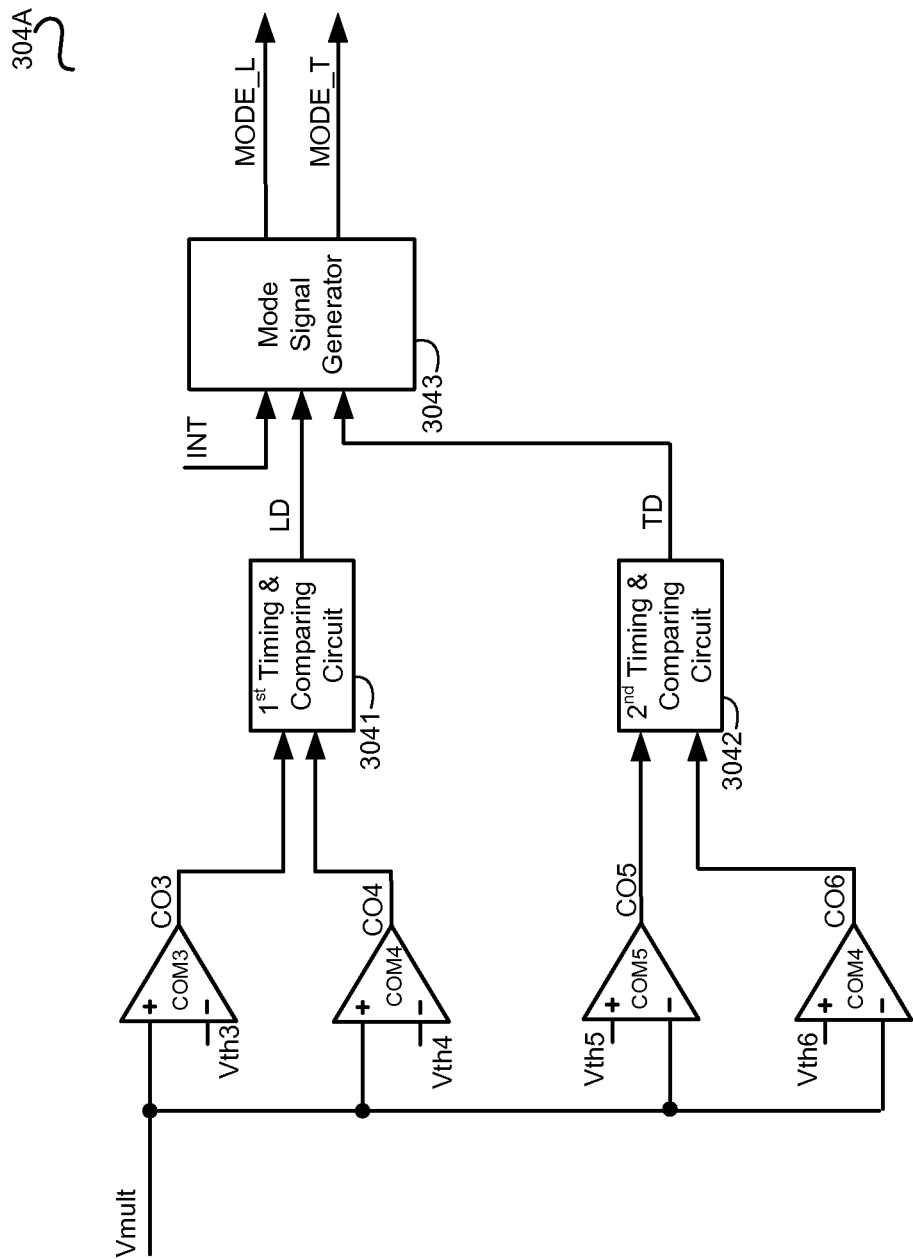
FIG. 6 schematically illustrates a dimming mode detector 304A in accordance with an embodiment of the present invention.

FIG. 6 schematically illustrates a dimming mode detector 304A in accordance with an embodiment of the present invention. The dimming mode detector 304A compares a rising time tr during which the voltage sensing signal Vmult increases from a fourth threshold voltage Vth4 to a third threshold voltage Vth3 with a first time threshold TTH1 to detect whether the LED driving apparatus is coupled to a leading edge dimmer. It further compares a falling time tf during which the voltage sensing signal Vmult decreases from a fifth threshold voltage Vth5 to a sixth threshold voltage Vth6 with a second time threshold TTH2 to detect whether the LED driving apparatus is coupled to a trailing edge dimmer. If the LED driving apparatus is not detected to be coupled to either a leading edge dimmer or a trailing edge dimmer in a predetermined time from the LED driving apparatus being powered on, the dimming mode detector 304A will conclude that the LED driving apparatus is not coupled to any dimmer.

The dimming mode detector 304A comprises comparators COM3-COM6, a first timing and comparing circuit 3041, a second timing and comparing circuit 3042 and a mode signal generator 3043. The third comparator COM3 has a first input terminal, a second input terminal and an output terminal, wherein the first input terminal is coupled to the voltage sensing circuit to receive the voltage sensing signal Vmult, the second input terminal is configured to receive the third threshold voltage Vth3, and wherein the third comparator COM3 compares the voltage sensing signal Vmult with the third threshold voltage Vth3 and generates a third comparison signal CO3 at the output terminal. The fourth comparator COM4 has a first input terminal, a second input terminal and an output terminal, wherein the first input terminal is coupled to the voltage sensing circuit to receive the voltage sensing signal Vmult, the second input terminal is configured to receive the fourth threshold voltage Vth4, and wherein the fourth comparator COM4 compares the voltage sensing signal Vmult with the fourth threshold voltage Vth4 and generates a fourth comparison signal CO4 at the output terminal.

The first timing and comparing circuit 3041 has a first input terminal, a second input terminal and an output terminal, wherein the first input terminal is coupled to the output terminal of the third comparator COM3, the second input terminal is coupled to the output terminal of the fourth comparator COM4, and wherein based on the third and fourth comparison signals CO3 and CO4, the first timing and comparing circuit 3041 calculates the rising time tr of the voltage sensing signal Vmult, compares the rising time tr with the first time threshold TTH1 and generates a leading edge detection signal LD at the output terminal.

The fifth comparator COM5 has a first input terminal, a second input terminal and an output terminal, wherein the first input terminal is configured to receive the fifth threshold voltage Vth5, the second input terminal is coupled to the voltage sensing circuit to receive the voltage sensing signal Vmult, and wherein the fifth comparator COM5 compares the voltage sensing signal Vmult with the fifth threshold voltage Vth5 and generates a fifth comparison signal CO5 at the output terminal. The sixth comparator COM6 has a first input terminal, a second input terminal and an output terminal, wherein the first input terminal is configured to receive the sixth threshold voltage Vth6, the second input terminal is coupled to the voltage sensing circuit to receive the voltage sensing signal Vmult, and wherein the sixth comparator COM6 compares the voltage sensing signal Vmult with the sixth threshold voltage Vth6 and generates a sixth comparison signal CO6 at the output terminal.

The second timing and comparing circuit 3042 has a first input terminal, a second input terminal and an output terminal, wherein the first input terminal is coupled to the output terminal of the fifth comparator COM5, the second input terminal is coupled to the output terminal of the sixth comparator COM6, and wherein based on the fifth and sixth comparison signals CO5 and CO6, the second timing and comparing circuit 3042 calculates the falling time tf of the voltage sensing signal Vmult, compares the falling time tf with the second time threshold TTH2 and generates a trailing edge detection signal TD at the output terminal.

The mode signal generator 3043 has a first input terminal, a second input terminal, a third input terminal, a first output terminal and a second output terminal, wherein the first input terminal is configured to receive a power on signal INT indicative of the power on the LED driving apparatus, the second input terminal is coupled to the output terminal of the first timing and comparing circuit 3041, the third input terminal is coupled to the output terminal of the second timing and comparing circuit 3042, and wherein based on the power on signal INT, leading edge detection signal LD and trailing edge detection signal TD, the mode signal generator 3043 generates the leading edge dimming mode signal MODE_L and trailing edge dimming mode signal MODE_T respectively at the two output terminals.

Figure 7:
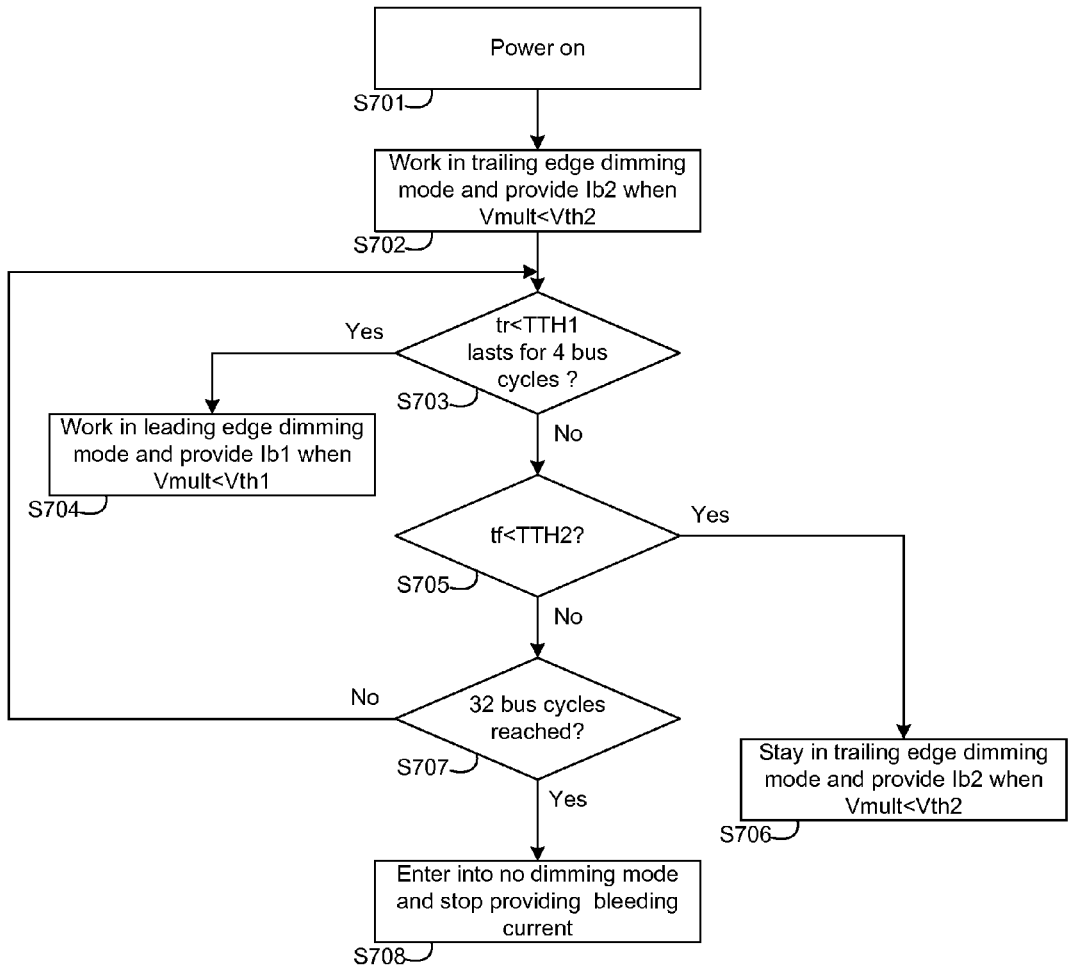
FIG. 7 illustrates a working flow chart of an LED driving apparatus in accordance with an embodiment of the present invention.

FIG. 7 illustrates a working flow chart of an LED driving apparatus in accordance with an embodiment of the present invention. It includes steps S701-S708.

At step S701, the LED driving apparatus is powered on.

At step S702, the LED driving apparatus enters into the trailing edge dimming mode and the second bleeding current Ib2 is provided when the voltage sensing signal Vmult becomes smaller than the second threshold voltage Vth2.

At step 703, the rising time tr of the voltage sensing signal Vmult is compared with the first time threshold TTH1 to detect whether the LED driving apparatus is coupled to a leading edge dimmer. If the LED driving apparatus is detected to be coupled to a leading edge dimmer, the process will proceed to step S704, else it will proceed to step S705. In one embodiment, the LED driving apparatus will be deemed as being coupled to a leading edge dimmer if the rising time tr is shorter than the first time threshold TTH1. In another embodiment, the LED driving apparatus will be deemed as being coupled to a leading edge dimmer only if the rising time is shorter than the first time threshold in a plurality of successive bus cycles (e.g. four successive bus cycles). The bus cycle here is directed to the cycle of the DC bus voltage Vbus.

At step S704, the LED driving apparatus enters into the leading edge dimming mode and the first bleeding current Ib1 is provided when the voltage sensing signal Vmult becomes smaller than the first threshold voltage Vth1.

At step S705, the falling time tf of the voltage sensing signal Vmult is compared with the second time threshold TTH2 to detect whether the LED driving apparatus is coupled to a trailing edge dimmer. If the LED driving apparatus is detected to be coupled to a trailing edge dimmer, the process will proceed to step S706, else it will proceed to step S707. In one embodiment, the LED driving apparatus will be deemed as being coupled to a trailing edge dimmer if the falling time tr is shorter than the second time threshold TTH2.

At step S706, the LED driving apparatus maintains in the trailing edge dimming mode and the second bleeding current Ib2 is still provided when the voltage sensing signal Vmult becomes smaller than the second threshold voltage Vth2.

At step S707, detect whether a predetermined time (for example, 32 bus cycles) from the LED driving apparatus being powered on is reached. If yes, the process goes to step S708, else, the process goes back to step S703.

At step S708, the LED driving apparatus enters into the no dimming mode and stop providing any bleeding current.

Figure 8:
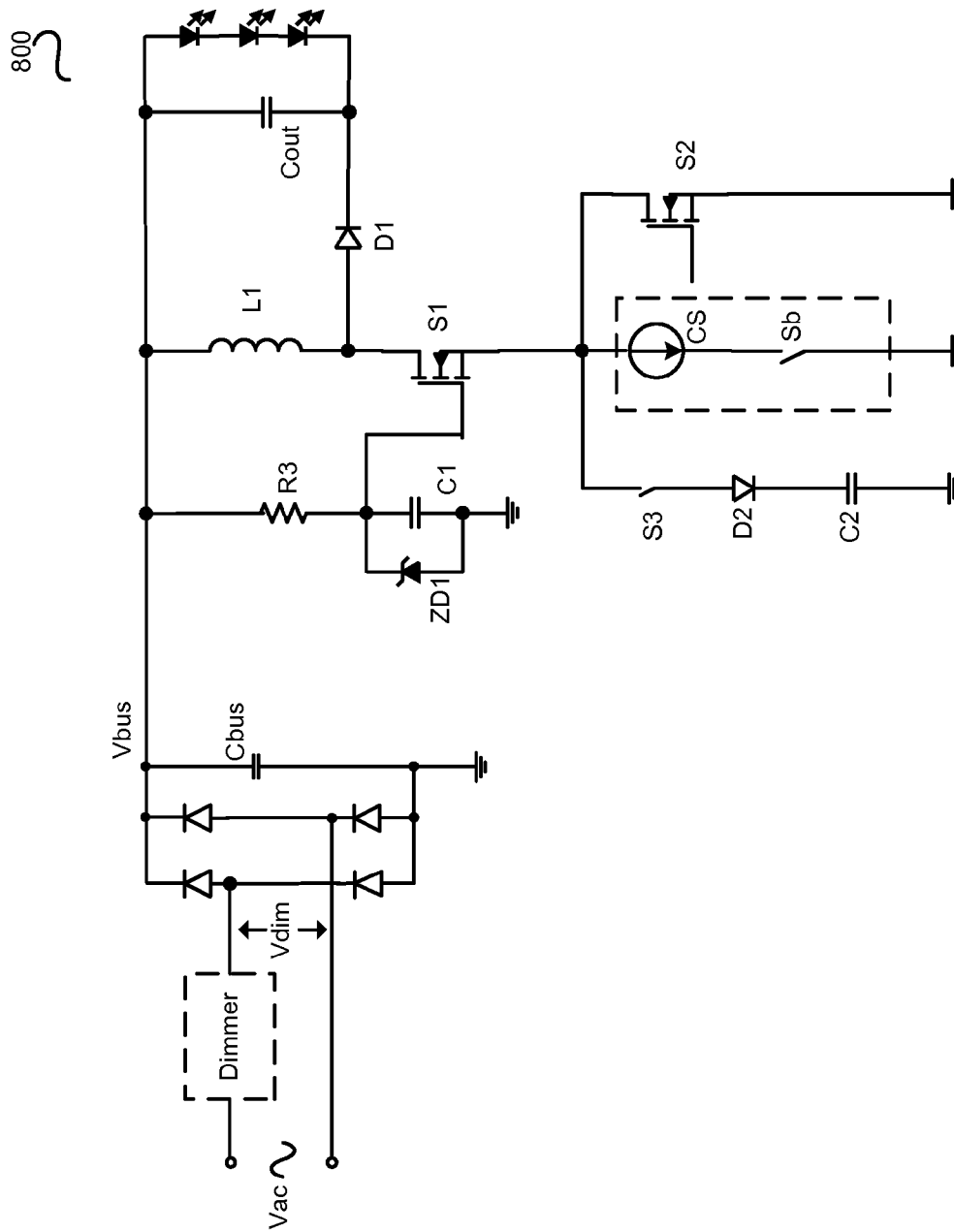
FIG. 8 schematically illustrates a block diagram of an LED driving apparatus 800 in accordance with an embodiment of the present invention.

Although the LED driving apparatuses shown in FIGS. 2 and 3 are both configured in flyback, it is not intended to limit the present invention. Other suitable topologies, such as a buck-boost shown in FIG. 8, can also be utilized. In reference to the LED driving apparatus 800 shown in FIG. 8, an inductor L1 instead of a transformer is utilized as a tank element. Moreover, a power supply circuit coupled between the first transistor S1 and the reference ground is further employed. The power supply circuit is used to provide power supply for ICs used in the LED driving apparatus 800. It comprises a transistor S3, a diode D2 and a power supply capacitor C2, all connected in serial.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An LED driving apparatus comprising:
   a rectifier bridge having an output terminal, wherein the rectifier bridge is configured to generate a DC bus voltage at the output terminal;
   a bus capacitor coupled between the output terminal of the rectifier bridge and a reference ground;
   a tank element having a first terminal and a second terminal, wherein the first terminal is coupled to the output terminal of the rectifier bridge;
   a first transistor having a first terminal, a second terminal and a control terminal, wherein the first terminal is coupled to the second terminal of the tank element;
   a second transistor having a first terminal, a second terminal and a control terminal, wherein the first terminal is coupled to the second terminal of the first transistor, the second terminal is coupled to the reference ground;
   a bleeding circuit coupled between the second terminal of the first transistor and the reference ground, wherein the bleeding circuit is configured to provide a bleeding current for the bus capacitor;

a voltage sensing circuit coupled to the output terminal of the rectifier bridge, wherein the voltage sensing circuit generates a voltage sensing signal indicative of the DC bus voltage;

a bleeding control circuit coupled to the voltage sensing circuit, wherein based on the voltage sensing signal, the bleeding control circuit generates a control signal to control the bleeding circuit;

a free-wheeling switch coupled between the tank element and LEDs; and an output capacitor coupled to the LEDs in parallel.

2. The LED driving apparatus of claim 1, wherein the bleeding circuit comprises:

a bleeding current source having a first terminal and a second terminal, wherein the first terminal is coupled to the second terminal of the first transistor and the first terminal of the second transistor; and a bleeding transistor having a first terminal, a second terminal and an output terminal, wherein the first terminal is coupled to the second terminal of the bleeding current source, the second terminal is coupled to the reference ground, and the control terminal is coupled to the bleeding control circuit to receive the control signal.

3. The LED driving apparatus of claim 1, further comprising:

a resistor having a first terminal and a second terminal, wherein the first terminal is coupled to the output terminal of the rectifier bridge;

a capacitor having a first terminal and a second terminal, wherein the first terminal is coupled to the second terminal of the resistor and the control terminal of the first transistor, the second terminal is coupled to the reference ground; and a zener diode having an anode and a cathode, wherein the cathode is coupled to the first terminal of the capacitor, the anode is coupled to the reference ground.

4. The LED driving apparatus of claim 1, wherein the tank element is an inductor or a transformer.

5. The LED driving apparatus of claim 1, further comprising:

a dimming mode detector coupled to the voltage sensing circuit, wherein based on the voltage sensing signal, the dimming mode detector detects whether the LED driving apparatus is coupled to a leading edge dimmer or a trailing edge dimmer, and provides a leading edge dimming mode signal and a trailing edge dimming mode signal to the bleeding control circuit; wherein if the LED driving apparatus is coupled to a leading edge dimmer, the bleeding circuit will provide a first bleeding current when the voltage sensing signal becomes smaller than a first threshold voltage; and if the LED driving apparatus is coupled to a trailing edge dimmer, the bleeding circuit will provide a second bleeding current when the voltage sensing signal becomes smaller than a second threshold voltage.

6. The LED driving apparatus of claim 5, wherein the bleeding circuit comprises:

a first bleeding current source having a first terminal and a second terminal, wherein the first terminal is coupled to the second terminal of the first transistor and the first terminal of the second transistor;

a first bleeding transistor having a first terminal, a second terminal and an output terminal, wherein the first terminal is coupled to the second terminal of the first bleeding current source, the second terminal is coupled to the reference ground, and the control terminal is coupled to the bleeding control circuit to receive a first control signal;

a second bleeding current source having a first terminal and a second terminal, wherein the first terminal is coupled to the second terminal of the first transistor and the first terminal of the second transistor; and a second bleeding transistor having a first terminal, a second terminal and an output terminal, wherein the first terminal is coupled to the second terminal of the second bleeding current source, the second terminal is coupled to the reference ground, and the control terminal is coupled to the bleeding control circuit to receive a second control signal.

7. The LED driving apparatus of claim 5, wherein the dimming mode detector compares a rising time during which the voltage sensing signal increases from a fourth threshold voltage to a third threshold voltage with a first time threshold to detect whether the LED driving apparatus is coupled to a leading edge dimmer, and compares a falling time during which the voltage sensing signal decreases from a fifth threshold voltage to a sixth threshold voltage with a second time threshold to detect whether the LED driving apparatus is coupled to a trailing edge dimmer.

8. The LED driving apparatus of claim 5, wherein if the LED driving apparatus is not detected to be coupled to either a leading edge dimmer or a trailing edge dimmer in a predetermined time from the LED driving apparatus being powered on, the LED driving apparatus will be deemed as not being coupled to any dimmer and the bleeding circuit will stop providing any bleeding current.

9. The LED driving apparatus of claim 5, wherein the bleeding control circuit comprises:

a first comparator having a first input terminal, a second input terminal and an output terminal, wherein the first input terminal is coupled to the voltage sensing circuit, the second input terminal is configured to receive the first threshold voltage, and wherein the first comparator compares the voltage sensing signal with the first threshold voltage and generates a first comparison signal at the output terminal;

a second comparator having a first input terminal, a second input terminal and an output terminal, wherein the first input terminal is coupled to the voltage sensing circuit, the second input terminal is configured to receive the second threshold voltage, and wherein the second comparator compares the voltage sensing signal with the second threshold voltage and generates a second comparison signal at the output terminal;

a first AND gate having a first input terminal, a second input terminal and an output terminal, wherein the first input terminal is coupled to the dimming mode detector to receive the leading edge dimming mode signal, the second input terminal is coupled to the output terminal of the first comparator to receive the first comparison signal, the output terminal is configured to provide a first control signal; and a second AND gate having a first input terminal, a second input terminal and an output terminal, wherein the first input terminal is coupled to the dimming mode detector to receive the trailing edge dimming mode signal, the second input terminal is coupled to the output terminal of the second comparator to receive the second comparison signal, the output terminal is configured to provide a second control signal.

10. The LED driving apparatus of claim 5, wherein the dimming mode detector comprises:

a third comparator having a first input terminal, a second input terminal and an output terminal, wherein the first input terminal is coupled to the voltage sensing circuit, the second input terminal is configured to receive a third threshold voltage, and wherein the third comparator compares the voltage sensing signal with the third threshold voltage and generates a third comparison signal at the output terminal;

a fourth comparator having a first input terminal, a second input terminal and an output terminal, wherein the first input terminal is coupled to the voltage sensing circuit, the second input terminal is configured to receive a fourth threshold voltage, and wherein the fourth comparator compares the voltage sensing signal with the fourth threshold voltage and generates a fourth comparison signal at the output terminal;

a first timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the first timing and comparing circuit calculates a rising time of the voltage sensing signal, compares the rising time with a first time threshold and generates a leading edge detection signal at the output terminal;

a fifth comparator having a first input terminal, a second input terminal and an output terminal, wherein the first input terminal is configured to receive a fifth threshold voltage, the second input terminal is coupled to the voltage sensing circuit, and wherein the fifth comparator compares the voltage sensing signal with the fifth threshold voltage and generates a fifth comparison signal at the output terminal;

a sixth comparator having a first input terminal, a second input terminal and an output terminal, wherein the first input terminal is configured to receive a sixth threshold voltage, the second input terminal is coupled to the voltage sensing circuit, and wherein the sixth comparator compares the voltage sensing signal with the sixth threshold voltage and generates a sixth comparison signal at the output terminal;

a second timing and comparing circuit having a first input terminal, a second input terminal and an output terminal, wherein the first input terminal is coupled to the output terminal of the fifth comparator, the second input terminal is coupled to the output terminal of the sixth comparator, and wherein based on the fifth and sixth comparison signals, the second timing and comparing circuit calculates a falling time of the voltage sensing signal, compares the falling time with a second time threshold and generates a trailing edge detection signal at the output terminal; and a mode signal generator having a first input terminal, a second input terminal, a third input terminal, a first output terminal and a second output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal and leading edge dimming mode signal respectively at the first and second output terminals.

11. The LED driving apparatus of claim 1, further comprising:

a third transistor having a first terminal, a second terminal and a control terminal, wherein the first terminal is coupled to the second terminal of the first transistor and the first terminal of the second transistor;

a diode having an anode and a cathode, wherein the anode is coupled to the second terminal of the third transistor; and a power supply capacitor coupled between the cathode of the diode and the reference ground.

12. An integrated circuit used in an LED driving apparatus, wherein the LED driving apparatus includes a rectifier bridge providing a DC bus voltage at an output terminal, a bus capacitor coupled between the output terminal of the rectifier bridge and a reference ground, a tank element coupled to the output terminal of the rectifier bridge, and a first MOSFET with its drain terminal coupled to the tank element, and wherein the IC comprises:

a second MOSFET having a drain terminal, a source terminal and a gate terminal, wherein the drain terminal is coupled to the source terminal of the first MOSFET, the source terminal is coupled to the reference ground;

a bleeding circuit coupled between the source terminal of the first MOSFET and the reference ground, wherein the bleeding circuit is configured to provide a bleeding current for the bus capacitor; and a bleeding control circuit configured to generate a control signal to control the bleeding circuit based on a voltage sensing signal indicative of the DC bus voltage.

13. The integrated circuit of claim 12, wherein the bleeding circuit comprises:

a bleeding current source having a first terminal and a second terminal, wherein the first terminal is coupled to the source terminal of the first MOSFET and the drain terminal of the second MOSFET; and a bleeding transistor having a first terminal, a second terminal and an output terminal, wherein the first terminal is coupled to the second terminal of the bleeding current source, the second terminal is coupled to the reference ground, and the control terminal is coupled to the bleeding control circuit to receive the control signal.

14. The integrated circuit of claim 12, wherein the LED driving apparatus further comprises:

a resistor having a first terminal and a second terminal, wherein the first terminal is coupled to the output terminal of the rectifier bridge;

a capacitor having a first terminal and a second terminal, wherein the first terminal is coupled to the second terminal of the resistor and the gate terminal of the first MOSFET, the second terminal is coupled to the reference ground; and a zener diode having an anode and a cathode, wherein the cathode is coupled to the first terminal of the capacitor, the anode is coupled to the reference ground.

15. The integrated circuit of claim 12, further comprising:

a dimming mode detector configured to receive the voltage sensing signal, wherein based on the voltage sensing signal, the dimming mode detector detects whether the LED driving apparatus is coupled to a leading edge dimmer or a trailing edge dimmer, and provides a leading edge dimming mode signal and a trailing edge dimming mode signal to the bleeding control circuit; wherein if the LED driving apparatus is coupled to a leading edge dimmer, the bleeding circuit will provide a first bleeding current when the voltage sensing signal becomes smaller than a first threshold voltage; and if the LED driving apparatus is coupled to a trailing edge dimmer, the bleeding circuit will provide a second bleeding current when the voltage sensing signal becomes smaller than a second threshold voltage.

16. The integrated circuit of claim 15, wherein the bleeding circuit comprises:
a first bleeding current source having a first terminal and a second terminal, wherein the first terminal is coupled to the source terminal of the first MOSFET and the drain terminal of the second MOSFET;
a first bleeding transistor having a first terminal, a second terminal and an output terminal, wherein the first terminal is coupled to the second terminal of the first bleeding current source, the second terminal is coupled to the reference ground, and the control terminal is coupled to the bleeding control circuit to receive a first control signal;
a second bleeding current source having a first terminal and a second terminal, wherein the first terminal is coupled to the source terminal of the first MOSFET and the drain terminal of the second MOSFET; and
a second bleeding transistor having a first terminal, a second terminal and an output terminal, wherein the first terminal is coupled to the second terminal of the second bleeding current source, the second terminal is coupled to the reference ground, and the control terminal is coupled to the bleeding control circuit to receive a second control signal.

17. The integrated circuit of claim 15, wherein the dimming mode detector compares a rising time during which the voltage sensing signal increases from a fourth threshold voltage to a third threshold voltage with a first time threshold to detect whether the LED driving apparatus is coupled to a leading edge dimmer, and compares a falling time during which the voltage sensing signal decreases from a fifth threshold voltage to a sixth threshold voltage with a second time threshold to detect whether the LED driving apparatus is coupled to a trailing edge dimmer.

18. The integrated circuit of claim 15, wherein if the LED driving apparatus is not detected to be coupled to either a leading edge dimmer or a trailing edge dimmer in a predetermined time from the LED driving apparatus being powered on, the LED driving apparatus will be deemed as not being coupled to any dimmer and the bleeding circuit will stop providing any bleeding current.

19. The integrated circuit of claim 15, wherein the bleeding control circuit comprises:
a first comparator having a first input terminal, a second input terminal and an output terminal, wherein the first input terminal is configured to receive the voltage sensing signal, the second input terminal is configured to receive the first threshold voltage, and wherein the first comparator compares the voltage sensing signal with the first threshold voltage and generates a first comparison signal at the output terminal;
a second comparator having a first input terminal, a second input terminal and an output terminal, wherein the first input terminal is configured to receive the voltage sensing signal, the second input terminal is configured to receive the second threshold voltage, and wherein the second comparator compares the voltage sensing signal with the second threshold voltage and generates a second comparison signal at the output terminal;
a first AND gate having a first input terminal, a second input terminal and an output terminal, wherein the first input terminal is coupled to the dimming mode detector to receive the leading edge dimming mode signal, the second input terminal is coupled to the output terminal of the first comparator to receive the first comparison signal, the output terminal is configured to provide a first control signal; and
a second AND gate having a first input terminal, a second input terminal and an output terminal, wherein the first input terminal is coupled to the dimming mode detector to receive the trailing edge dimming mode signal, the second input terminal is coupled to the output terminal of the second comparator to receive the second comparison signal, the output terminal is configured to provide a second control signal.

20. The integrated circuit of claim 15, wherein the dimming mode detector comprises:
a third comparator having a first input terminal, a second input terminal and an output terminal, wherein the first input terminal is configured to receive the voltage sensing signal, the second input terminal is configured to receive a third threshold voltage, and wherein the third comparator compares the voltage sensing signal with the third threshold voltage and generates a third comparison signal at the output terminal;
a fourth comparator having a first input terminal, a second input terminal and an output terminal, wherein the first input terminal is configured to receive the voltage sensing signal, the second input terminal is configured to receive a fourth threshold voltage, and wherein the fourth comparator compares the voltage sensing signal with the fourth threshold voltage and generates a fourth comparison signal at the output terminal;
a first timing and comparing circuit having a first input terminal, a second input terminal and an output terminal, wherein the first input terminal is coupled to the output terminal of the third comparator, the second input terminal is coupled to the output terminal of the fourth comparator, and wherein based on the third and fourth comparison signals, the first timing and comparing circuit calculates a rising time of the voltage sensing signal, compares the rising time with a first time threshold and generates a leading edge detection signal at the output terminal;
a fifth comparator having a first input terminal, a second input terminal and an output terminal, wherein the first input terminal is configured to receive a fifth threshold voltage, the second input terminal is configured to receive the voltage sensing signal, and wherein the fifth comparator compares the voltage sensing signal with the fifth threshold voltage and generates a fifth comparison signal at the output terminal;
a sixth comparator having a first input terminal, a second input terminal and an output terminal, wherein the first input terminal is configured to receive a sixth threshold voltage, the second input terminal is configured to receive the voltage sensing signal, and wherein the sixth comparator compares the voltage sensing signal with the sixth threshold voltage and generates a sixth comparison signal at the output terminal;
a second timing and comparing circuit having a first input terminal, a second input terminal and an output terminal, wherein the first input terminal is coupled to the output terminal of the fifth comparator, the second input terminal is coupled to the output terminal of the sixth comparator, and wherein based on the fifth and sixth comparison signals, the second timing and comparing circuit calculates a falling time of the voltage sensing signal, compares the falling time with a second time threshold and generates a trailing edge detection signal at the output terminal; and a mode signal generator having a first input terminal, a second input terminal, a third input terminal, a first output terminal and a second output terminal, wherein the first input terminal is configured to receive a power on signal, the second input terminal is coupled to the output terminal of the first timing and comparing circuit, the third input terminal is coupled to the output terminal of the second timing and comparing circuit, and wherein based on the power on signal, leading edge detection signal and trailing edge detection signal, the mode signal generator generates the trailing edge dimming mode signal and leading edge dimming mode signal respectively at the first and second output terminals.

* * * * *